United States Patent [19]

Lagnier

[11] Patent Number: 5,316,063
[45] Date of Patent: May 31, 1994

[54] TREAD HAVING GROOVES WITH INCISIONS IN THE WALLS

[75] Inventor: Alain Lagnier, Romagnat, France

[73] Assignee: Compagnie Generale Des Establissements Michelin - Michelin & CIE, Clermont-Ferrand Cedex, France

[21] Appl. No.: 977,817

[22] Filed: Nov. 17, 1992

[30] Foreign Application Priority Data

Nov. 18, 1991 [FR] France .................. 91/14278

[51] Int. Cl.$^5$ .............................. B60C 11/12
[52] U.S. Cl. .................. 152/209 R; 152/DIG. 3
[58] Field of Search ........ 152/209 R, 209 D, DIG. 1, 152/DIG. 3

[56] References Cited

U.S. PATENT DOCUMENTS

| | | |
|---|---|---|
| 3,727,661 | 4/1973 | Hoke . |
| 3,763,911 | 10/1973 | Montagne .................. 152/209 R |
| 3,954,130 | 5/1976 | Verdier ...................... 152/209 R |
| 4,303,115 | 12/1981 | Flechtner et al. . |
| 4,794,965 | 1/1989 | Lagnier ...................... 152/209 R |
| 4,994,126 | 2/1991 | Lagnier ...................... 152/209 R |
| 5,095,963 | 3/1992 | Maitre . |

FOREIGN PATENT DOCUMENTS

| | | | |
|---|---|---|---|
| 0116509 | 6/1985 | Japan ...................... 152/DIG. 3 |
| 0009009 | 1/1989 | Japan ...................... 152/209 R |
| 3135803 | 6/1991 | Japan ...................... 152/209 R |

Primary Examiner—Michael W. Ball
Assistant Examiner—Nancy T. Krawczyk
Attorney, Agent, or Firm—Brumbaugh, Graves, Donohue & Raymond

[57] ABSTRACT

In order to improve the compromise between the properties of adherence to snow-covered or icy ground and its wear properties, the tread of a tire which is provided with incisions having a width other than zero and, seen in cross section, fork-shaped traces with two branches, has grooves the walls of which are provided with an incision which forms with the trace of the groove a trace which is symmetrical to the trace of the incision which is parallel to and closest to said groove.

5 Claims, 3 Drawing Sheets

TREAD HAVING GROOVES WITH INCISIONS IN THE WALLS

BACKGROUND OF THE INVENTION

The present invention relates to the tread of a highway tire having a radial carcass reinforcement and a tread reinforcement which is particularly suited for travel on snow-covered, icy or wet ground.

The tread of the present invention is generally formed of elements in relief, namely ribs or blocks, which are separated from each other in circumferential direction and/or in transverse direction by grooves and are provided with numerous incisions or slits of a width, other than zero, which is far less than the width of the circumferential and transverse grooves which define the elements in relief.

The width of an incision, which is generally variable as a function of the size of the tire in question, is between 0.2 mm and 2 mm.

Based on the principal forces exerted by the ground on the relief elements of the tread, the tread generally comprises blocks provided with incisions, the traces of which on the surface of the tread are parallel to each other and the center axes of which are parallel to the center axis of the transverse grooves defining the block. The incisions are active either upon driving torque imposed upon the wheel or upon braking torque. The tread may also have blocks provided with incisions which are parallel to each other and parallel to the circumferential grooves.

The traces on the surface of the tread may be linear, undulated, or zigzag; the center axes of said traces are straight lines indicating the average direction of said traces.

The term "transverse grooves", as used herein, means grooves or portions of grooves, having on the surface of the tread a center axis which forms an angle of between $-20°$ and $+20°$ with the axial direction or direction parallel to the axis of rotation. The term "circumferential grooves", as used herein, means grooves or portions of grooves which form an angle of between $-20°$ and $+20°$ with the circumferential direction of the tire. In the same way, the traces of the incisions will be parallel to each other if the angle formed by said traces is between $-20°$ and $+20°$.

To improve the overall wear of the tread or the adherence to ground of the tire in question, numerous forms of incisions have been proposed. In order to remedy the substantial defect in adherence which is present as from a rate of wear of the tread of between 30 and 55% while decreasing the speed of wear at the beginning of the life of the tire, U.S. Pat. No. 4,994,126 proposes incisions which, in cross section, form traces in the shape of forks having at least two branches, which branches may have the general shape of either a U or a V.

The compromise between the adherence properties and the wear properties obtained with this type of incision is very good. However, it can be improved, in particular, by a substantial gain in adherence on ground of the tire in question while permitting very acceptable road behavior.

SUMMARY OF THE INVENTION

For this purpose, the tread of a tire with radial carcass reinforcement and a crown reinforcement comprising at least elements in relief or blocks separated by circumferential and transverse grooves provided with incisions of width e other than zero and between 0.2 and 2 mm which have, on the surface of the tread, traces parallel to each other, the center axes of which form angles at most equal in absolute value to 40° either with the axial direction or with the circumferential direction and have, in cross section, traces of width e which, starting from a certain depth h1, are subdivided into two branches, is characterized by the fact that the grooves, parallel to the average orientation of the incisions of a block, have, as viewed in cross section, walls provided with an incision which commences at a height h1 and the trace of which over the remaining depth (h−h1) forms, with the trace of the groove down to the depth h, a trace which is symmetrical, with respect to a straight line perpendicular to the surface of the tread, to the trace of the incision closest to the groove, h being the depth of said incision.

The presence of this incision permits the slice of rubber closest to the groove to retain a maximum surface of contact with the ground under the effect of the longitudinal or transverse forces experienced by the tread of the tire in question.

In order to permit the edges created by the incisions to become worn without resulting in excessively rapid wear of the slices between incisions, it is particularly advantageous for the traces of the branches of the incisions to be in the form of a V, the two branches extending a first portion of the incision, which is preferably inclined with respect to the direction perpendicular to the surface of the tread by an angle of between $-20°$ and $+20°$, the V branches forming an angle of at most 40°.

DESCRIPTION OF THE DRAWINGS

The characteristics and advantages of the present invention will be better understood from the following description of the drawing which, by way of illustration and not of limitation, shows various embodiments.

DESCRIPTION OF PREFERRED EMBODIMENTS

Figure 1:
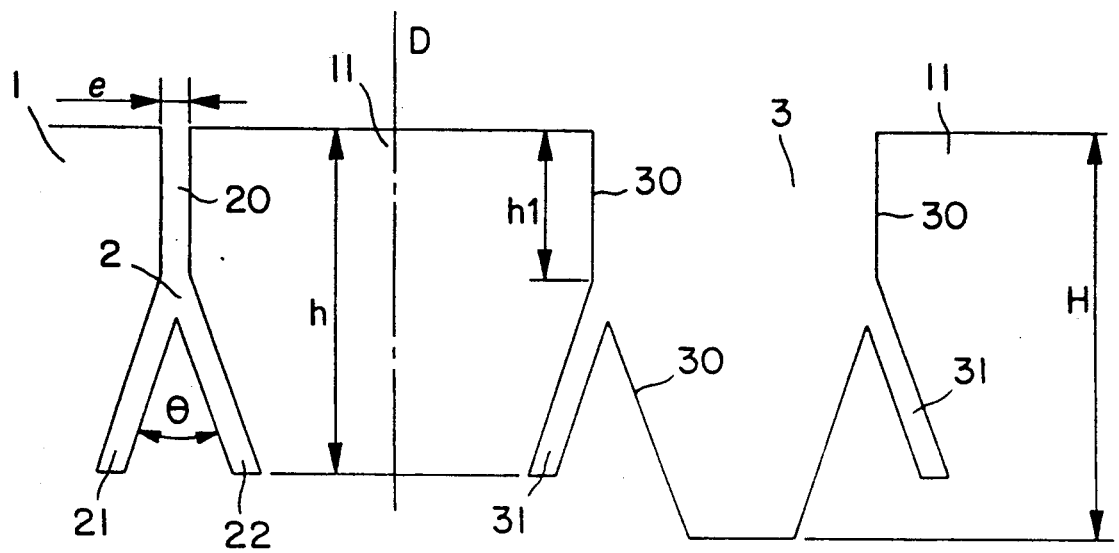
FIG. 1 is a view, along a sectional plane perpendicular to the surface of the tread and to the average orientation of the transverse groove and the transverse incisions, of the blocks adjacent to the groove.

A portion of the tread 1 of a tire has elements in relief or blocks 11 separated from each other by circumferential and transverse grooves 3 of widths of between 3 and 7 mm. FIG. 1 shows, in cross section through a plane perpendicular to the orientation of the groove 3 and incisions 2, a groove 3 separating two blocks 11 provided with incisions 2, the traces of which on the surface of the tread are parallel to each other and to the average orientation of the groove 3. The transverse groove 3 has a depth H equal to 9 mm. The incisions 2, of a width of 0.8 mm, are incisions comprising, starting from the surface of the tread 1, a linear portion 20 perpendicular to said surface and extended radially inward by two branches 21 and 22 of a width of 0.4 mm. The linear portion 20 extends over a depth h1 equal to 3.6 mm, namely 0.45 h, h being the total depth of the incision 2, namely 8 mm. The two branches 21 and 22 form an angle $\theta$ of 30° with each other.

On the wall 30 of the groove 3 there commences, at the depth h1, an incision 31, the trace of which, over the depth (h−h1), is inclined. Said trace forms with the trace 30 of the wall of the groove 3 present up to the depth h a trace symmetrical, with respect to a straight line D perpendicular to the surface of the tread, to the trace of the incision 2 closest circumferentially to the groove 3.

Figure 2A:
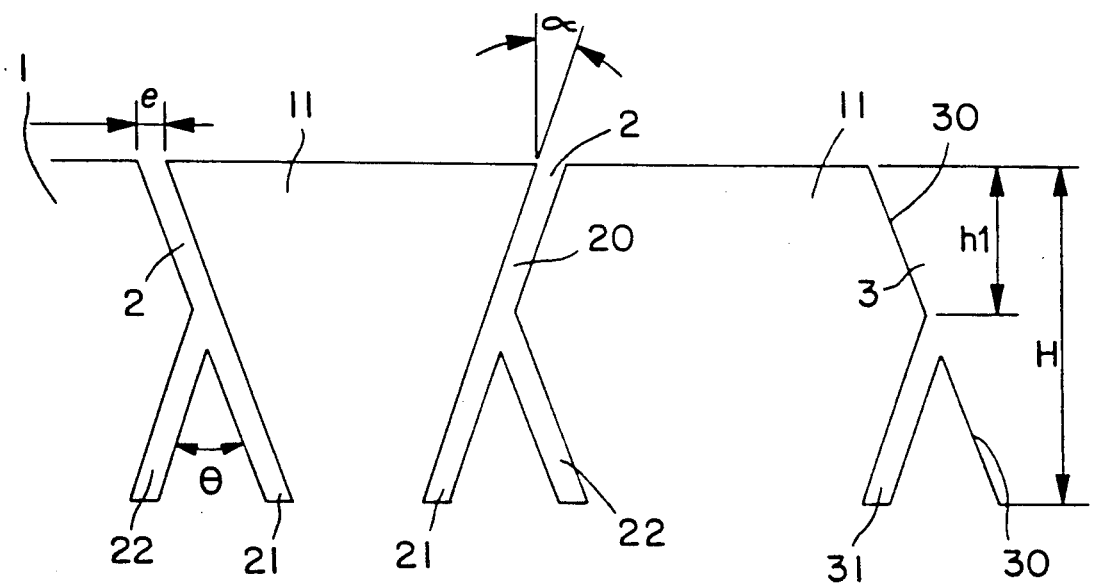
FIGS. 2A to 2D show variant embodiments.

FIG. 2A shows a block 11 of a tread 1, which differs from the block 11 of FIG. 1 by the fact that the incisions 2, starting from the surface of the tread 1, have linear traces 20 inclined with respect to a perpendicular to the surface of the tread by an angle $\alpha$ equal to $\pm 10°$ so that two adjacent incisions have inclinations of opposite orientation, the inclination of the wall 30 of the groove 3 being, over the depth h1, of orientation opposite that of the linear portion 20 of the incision 2 closest circumferentially to the groove 3.

Figure 2B:
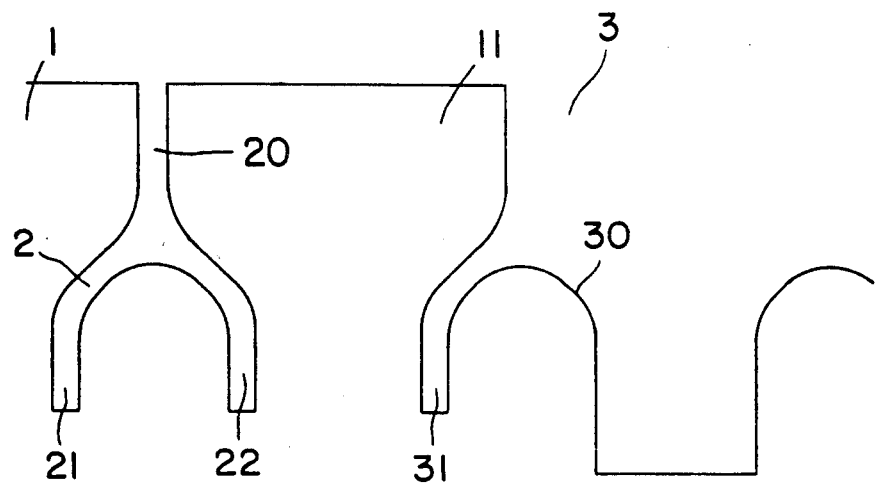
Figure 2C:
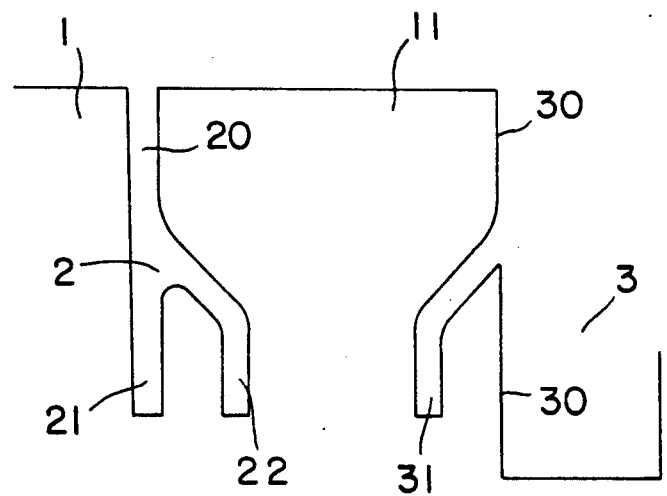

In FIGS. 2B and 2C, the blocks 11 are provided with incisions 2, the branches 21 and 22 of which have traces, seen in cross section, having the shape of a U (FIG. 2B) or the shape of the bottom portion of an h (FIG. 2C).

Figure 2D:
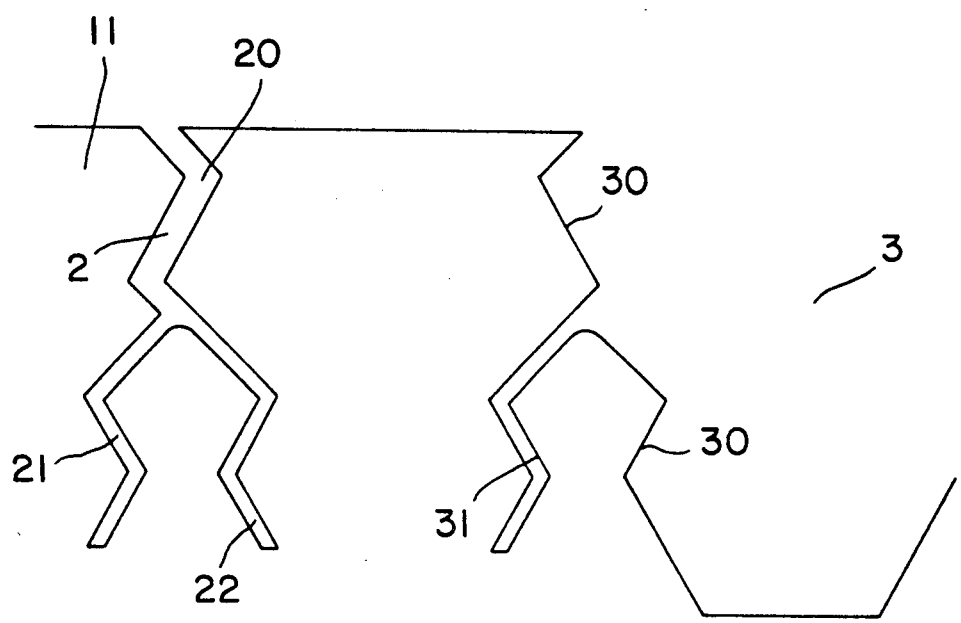

FIG. 2D shows a block 11 provided with incisions 2 which combine the following characteristics: the incisions have zigzag portions 20 which connect the surface of the tread to two zigzag branches 21 and 22. In accordance with the invention, the incision 31 which commences on the wall 30 also has a zigzag trace and the wall 30 has a shape adapted to this. This combination of characteristics permits the tread 1, equipped in this manner, to present a remarkable uniformity of wear while presenting, throughout its life, substantially the same number of effective edges in the case of driving as the number of effective edges in the case of braking.

I claim:

1. A tread (1), when in an annular configuration for a tire with radial carcass reinforcement and a tread reinforcement, comprising at least elements in relief or blocks (11) separated by circumferential and transverse grooves (3), provided with incisions (2) of width e other than zero and between 0.2 and 2 mm and having on the surface of the tread (1) traces parallel to each other and forming with the axial direction or with the circumferential direction angles at most equal in absolute value to 40°, and in cross section traces of width e which, starting from a certain depth h1 greater than zero, are subdivided into two branches (21, 22) of width e/2, characterized by the fact that the grooves (3) parallel to the average orientation of the incisions in a block, seen in cross section, have walls (30) provided with an incision (31) commencing at the depth h1 and the trace of which over the remaining depth (h−h1) forms with the trace of the wall (30) of the groove (3) down to the depth h a trace symmetrical, with respect to a straight line D perpendicular to the surface of the tread, to the trace of the incision (2) closest to the groove (3), h being the depth of said incision.

2. A tread according to claim 1, characterized by the fact that the incision (2) closest to the groove (3) comprises a first portion (20) perpendicular to the surface of the tread (1) extended radially to the inside by two linear branches (21, 22) arranged symmetrically on both sides of the extension of the first portion (20), forming an angle of at most 20° with said extension.

3. A tread according to claim 1, characterized by the fact that the incision (2) closest to the groove (3) comprises a first linear portion (20), inclined by an angle $\alpha$ of between $-20°$ and $+20°$ with respect to a perpendicular to the surface of the tread (1), and two linear first branches (21, 22), the branch (21) being in the extension of the portion (20) and the second branch (22) forming an angle $\theta$ of at most 40° with the branch (21).

4. A tread according to claim 1, characterized by the fact that the blocks (11) comprise incisions (2) with first portions (20) inclined by an angle $\alpha$ of between $-20°$ and $+20°$ and linear branches (21, 22) forming with each other an angle $\theta$ of at most 40°, the first portions (20) of the adjacent incisions (2) having opposite orientations of $-\alpha$ and $+\alpha$, respectively.

5. A tread according to claim 1, characterized by the fact that the blocks (11) comprise incisions (2) with first portions (20) the cross sectional traces of which are of zigzag or undulated shape and branches (21, 22) the cross sectional traces of which are also of zigzag or undulated shape and symmetrical with respect to the extension of the center axis of the trace of the first portion (20).

* * * * *

UNITED STATES PATENT AND TRADEMARK OFFICE
CERTIFICATE OF CORRECTION

PATENT NO. : 5,316,063

DATED : May 31, 1994

INVENTOR(S) : Alain Lagnier

It is certified that error appears in the above-identified patent and that said Letters Patent is hereby corrected as shown below:

Col. 4, line 24, "linear first" should read --linear--;

Col. 4, line 25, "branch" should read --first branch--.

Signed and Sealed this

Eleventh Day of October, 1994

Attest:

BRUCE LEHMAN

Attesting Officer

Commissioner of Patents and Trademarks